2 Sheets--Sheet 1.

L. J. MARCY.

Magic Lanterns.

No. 5,686.

Reissued Dec. 16, 1873

Attest;
C. E. Davidson.
Baltis D. Long.

Inventor;
L. J. Marcy
by his Atty
Wm. D. Baldwin

2 Sheets--Sheet 2.

L. J. MARCY.

Magic Lanterns.

No. 5,686. Reissued Dec. 16, 1873.

Attest;
E. B. Davidson.
Battis & Long.

Inventor;
L. J. Marcy
by his Atty
Wm D Baldwin

UNITED STATES PATENT OFFICE.

LORENZO J. MARCY, OF PHILADELPHIA, PENNSYLVANIA.

IMPROVEMENT IN MAGIC LANTERNS.

Specification forming part of Letters Patent No. 77,300, dated April 28, 1868; reissue No. 5,686, dated December 16, 1873; application filed May 31, 1873.

*To all whom it may concern:*

Be it known that I, LORENZO JAMES MARCY, formerly of Newport, Rhode Island, but now of Philadelphia, Pennsylvania, have invented certain new and useful Improvements in Magic Lanterns, of which the following is a specification:

The objects sought to be obtained by my invention are, to produce a cheap and simple, but effective, instrument adapted for use with an oil-lamp; to reduce its dimensions to the smallest practicable limits; to prevent the heating of the lantern; to make its parts easily adjustable or detachable; to hold the pictures firmly in the slides, and to shift the slides quickly. The means by which these objects are attained constitute the subject-matter herein claimed.

Figure 1:
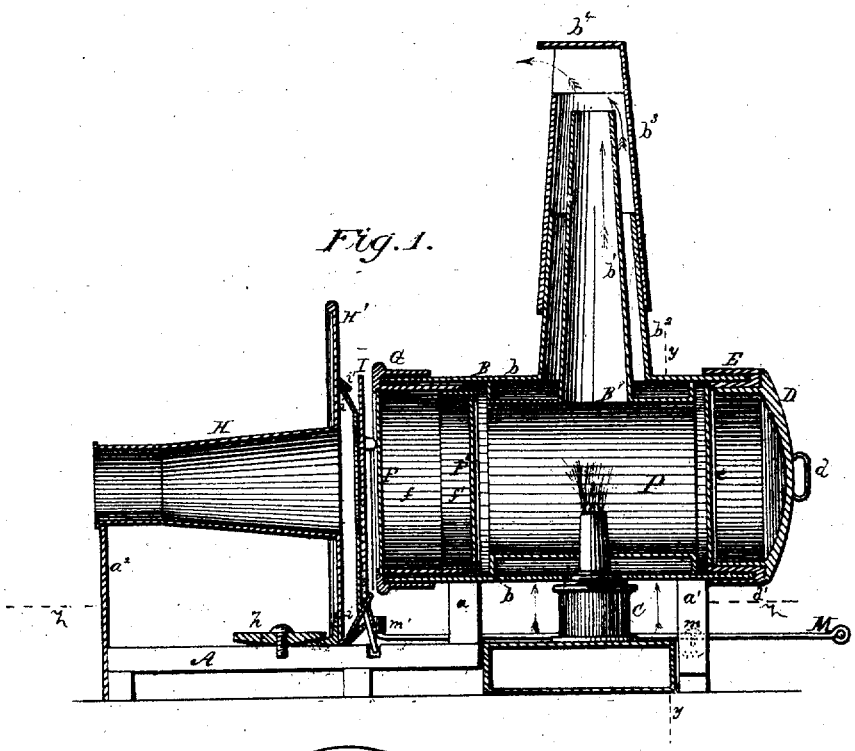
Figure 2:
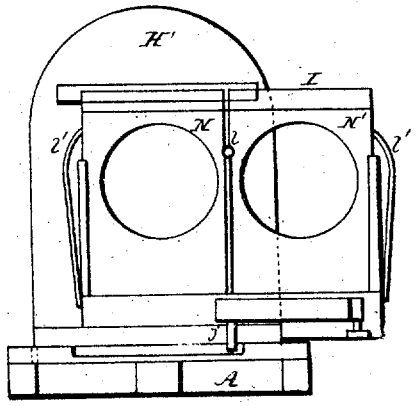
Figure 3:
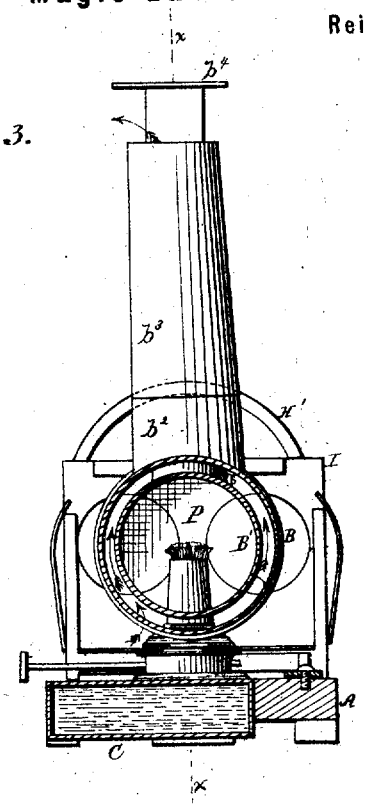
Figure 4:
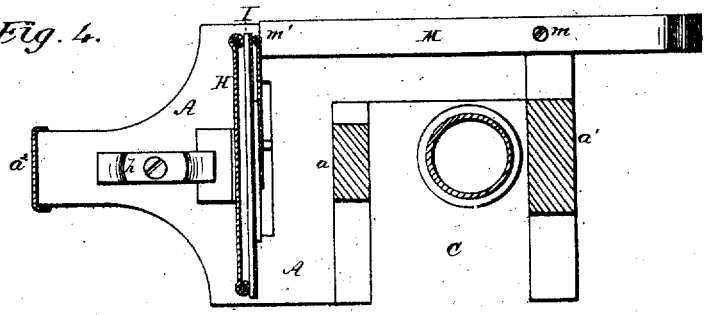

In the accompanying drawings, Figure 1 represents a vertical central longitudinal section through the lantern on the line *x x* of Fig. 3. Fig. 2 represents a back view of the slide-frame and tube-plate. Fig. 3 represents a vertical transverse section through the lantern on the line *y y* of Fig. 1, and Fig. 4 represents a horizontal section through the same on the line *z z* of Fig. 1.

The apparatus is mounted on a base, A, by preference made of wood, which is practically a non-conductor of heat. The body of the lantern is mounted upon standards or posts $a$ $a^1$, so as to leave a space between the base and body for air to circulate to cool the instrument; this arrangement also elevates the body of the lantern, and thus affords space in which to arrange certain parts of the apparatus without obstructing the lenses. The body of the lantern is composed of two concentric shells or cylinders of sheet metal. The inner shell B′ is made shorter than the outer one, B, and of smaller diameter, so as to leave an air-space between them, which space may be filled with plaster-of-paris or other non-conductor of heat; or rings of plaster may be employed to keep the shells apart, and metallic connections between them be avoided. In the drawings, however, I have shown the shells as kept in the proper relation to each other by simple flanges $b$ on the ends of the inner cylinder. The outer shell is larger and longer than the inner one, but is of a diameter only slightly exceeding that of the lenses. Each cylinder is provided with its appropriate chimney, $b^1$ $b^2$, the outer one, $b^2$, having a joint or extension piece, $b^3$, to regulate the draft, which piece is provided with a hood, $b^4$, to prevent light from shining up the chimney. The base and both shells are perforated to admit a lamp, C. The products of combustion escape through the inner chimney $b^1$, thus inducing a current of cool air to rise through the space between the shells into the space between the chimneys, thus keeping the body of the lantern cool. I am thus enabled to use a much smaller lantern than heretofore has been deemed practicable. A reflector is fitted in a cap, D, provided with a handle, $d$, and with a flange, $d'$, which fits into a double ring, E, having an annular space, into which the end of the outer cylinder fits. A glass, $e$, is fitted into the inner ring to protect the reflector from smoke and dust. The condensing-lenses F F′ (of the usual plano-convex variety) are secured in short tubes $f$ $f'$, one sliding within the other, to adjust the focus properly. The larger of these tubes is fastened to a flanged cap, G, which fits over the outer shell B. The objective tube H is arranged in the same axial plane as the lenses; its front end rests in a crutch, $a^2$, secured to the base A, having its top properly recessed to receive it, while its rear end is supported by a tube-plate, H′, which rests on the base A, to which it is fastened by pins. A button, $h$, on the base hooks over a flange on the tube-plate, and locks it vertically in position, while admitting of its easy removal or replacement. The tube, it will be observed, has no connection with the lantern-box, except through the base A, thus leaving an unobstructed space between them for the insertion of the slides. A slide-frame, I, is provided with flanges $i$, which run in grooves $i'$ on the tube-plate, thus permitting the slides to be moved freely laterally. A stop, $j$, on the slide works in a groove in the base to limit the movement of the slide-frame. A pin, $l$, in the frame forms a division between the picture-glasses when more than one is used at a time in the frame, and springs $l'$ retain them in place. A lever, M, vibrating on a fulcrum, $m$, on the base, is pivoted at $m'$ to the slide-frame, and may be used to reciprocate the slides, when desired. The picture-glasses slide vertically within grooves or flanges in the slide-frame. When used as a signal-lantern, the tube and slide and their appurtenances are removed.

From the foregoing description, it will be seen that my improved instrument combines the qualities of simplicity, cheapness, compactness, portability, and efficiency in a high degree, and that the parts are readily accessible, separable, and replaceable, as the lamp-chamber is in the center of the lantern-box, while the reflector is at one end and the condensing-lenses at the other.

What I claim as my invention, and desire to secure by Letters Patent, is—

1. A magic-lantern box constructed, substantially as hereinbefore described, with a flame-chamber of metal surrounded, or partially surrounded, by an outer casing of non-conducting material.

2. A magic-lantern box constructed, substantially as described, with a cylindrical shell of a diameter only slightly exceeding that of the reflector and lenses which close its ends, for the purposes specified.

3. The combination, substantially as described, in a magic lantern, of the base, the supporting-standards, the lantern-box supported above the base, and the removable caps containing the reflector and slide, and closing the ends of the box.

4. The combination, substantially as set forth, in a magic lantern, of a tubular body, having a reflector at one end and lenses at the other, with a lamp-chamber and chimney interposed between the reflector and lenses, for the purposes specified.

5. The combination of the tubular double-walled lamp-body, the reflector-cap, and the glass interposed between the reflector and lamp, these members being constructed and operating in combination substantially as set forth.

6. The connection of the objective tube with the base by detachable fastenings, substantially in the manner described, to admit of its easy removal and replacement.

7. The combination, substantially as set forth, of a lantern-box, a base, and an objective tube, whereby the base alone forms the connection between the tube and box, and an unobstructed space is left between them for the slides.

8. The combination of the lamp-body, the detached tube-plate, and the slide-frame moving in guides in said plate, these members being constructed and operating in combination substantially as set forth.

9. The combination, substantially as set forth, in a magic lantern, of a supporting-base, an elevated lantern-body overhanging its supports, and a slide-frame mounted on said base independently of the lantern-body.

10. The combination, substantially as set forth, of the base, the lantern-body, the objective tube, the slide-frame, and the stop which limits the movement of the slide-frame.

11. The combination, substantially as set forth, of the slide-frame and its shifting-lever.

12. The combination, substantially as before set forth, of the base, the elevated lantern-body, the slide-frame, the shifting-lever, and the stop, for the purposes described.

L. J. MARCY.

Witnesses:
JOE I. PEYTON,
E. C. DAVIDSON.